United States Patent [19]
McLeod

[11] Patent Number: 5,827,362
[45] Date of Patent: Oct. 27, 1998

[54] MODIFIED ORGANOCLAYS

[75] Inventor: Neil Andrew McLeod, West Midlands, United Kingdom

[73] Assignee: Envirotreat Limited, United Kingdom

[21] Appl. No.: 753,228

[22] Filed: Nov. 22, 1996

[51] Int. Cl.⁶ .................................................. C04B 14/04
[52] U.S. Cl. ........................ 106/416; 106/486; 501/146; 502/84; 210/909; 588/249; 588/250; 423/118.1
[58] Field of Search .................................. 106/416, 486; 501/146; 588/9, 13, 251, 250, 249; 502/84; 210/909; 423/118.1

[56]        References Cited

U.S. PATENT DOCUMENTS

| | | | |
|---|---|---|---|
| 4,176,090 | 11/1979 | Vaughan et al. | 252/455 Z |
| 4,271,043 | 6/1981 | Vaughan et al. | 252/455 R |
| 4,666,877 | 5/1987 | Vaughan | 502/84 |
| 4,719,191 | 1/1988 | Battiste et al. | 502/84 |
| 4,740,488 | 4/1988 | Fogler et al. | 502/84 |
| 4,855,268 | 8/1989 | Raythatha | 502/63 |
| 4,916,095 | 4/1990 | Fogler et al. | 502/62 |
| 4,957,889 | 9/1990 | McCauley | 502/65 |
| 5,457,272 | 10/1995 | Hooykaas | 502/84 |

FOREIGN PATENT DOCUMENTS

| | | |
|---|---|---|
| 0256185 | 2/1988 | European Pat. Off. . |
| 0279251 | 8/1988 | European Pat. Off. . |
| 0424187 | 4/1991 | European Pat. Off. . |
| 0508005 | 10/1992 | European Pat. Off. . |
| 0536879 | 4/1993 | European Pat. Off. . |
| 2617737 | 1/1989 | France ................ 502/84 |
| 2059408 | 4/1981 | United Kingdom . |
| 2182919 | 5/1987 | United Kingdom . |
| 2254321 | 10/1992 | United Kingdom . |

OTHER PUBLICATIONS

Science 22 Apr. 1983 vol. 220, No. 4595, "Intercalated Clay Catalysts" Pinnavaia pp. 365–371.

Primary Examiner—Paul Marcantoni
Attorney, Agent, or Firm—Fulwider Patton Lee & Utecht, LLP

[57]        ABSTRACT

The invention provides a range of modified organoclays comprising intercalated moieties to provide an effective mechanism for attracting organic compounds into the interlamellar spaces in close proximity to other intercalated reactants. The intercalated moieties provide three functions, namely (a) pillaring to create adequate interlamellar spacing to provide access for larger molecules, e.g. polychlorinated biphenyls and poly aromatic hydrocarbons, (b) organophilic attraction of like polarity organic compounds, and (c) a reactive environment in which the organic substrates can be permanently bonded to the clay surfaces and pillaring agents. The invention also resides in methods of treating soil or other materials with such modified organoclays in order to remove or bind hazardous organic molecules.

7 Claims, 16 Drawing Sheets

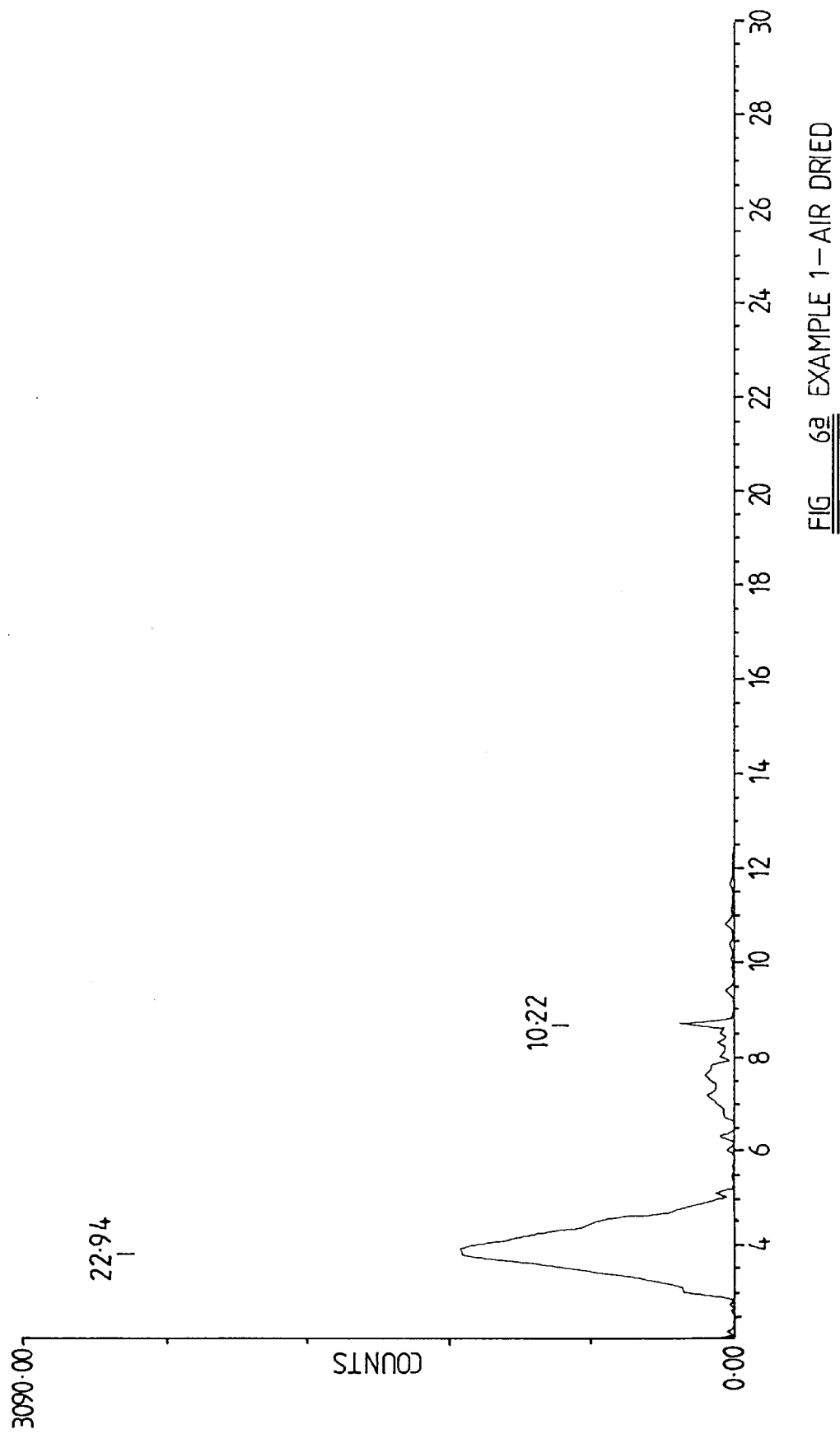
FIG 6a EXAMPLE 1 – AIR DRIED

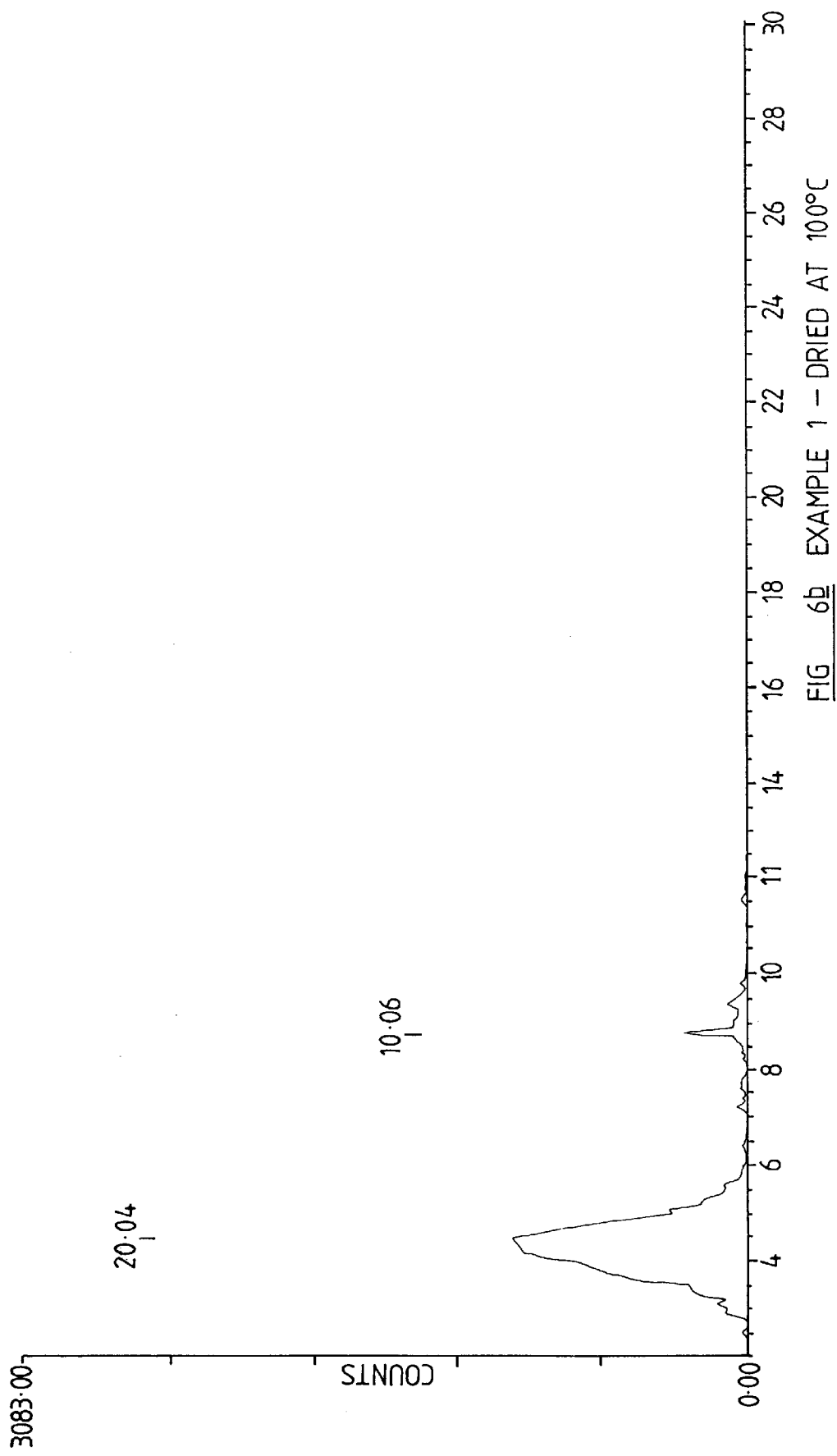
FIG 6b EXAMPLE 1 – DRIED AT 100°C

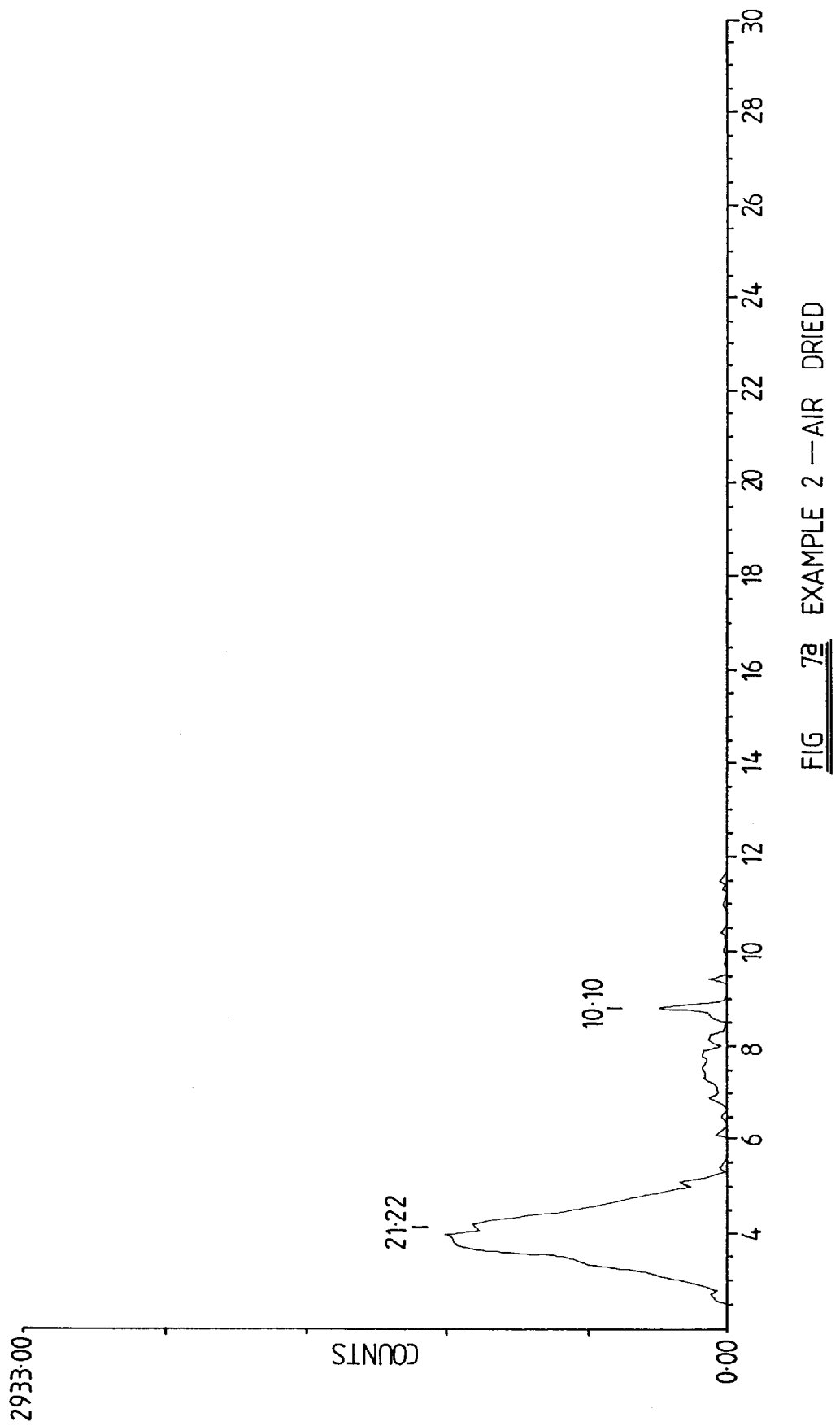
FIG 7a  EXAMPLE 2 — AIR DRIED

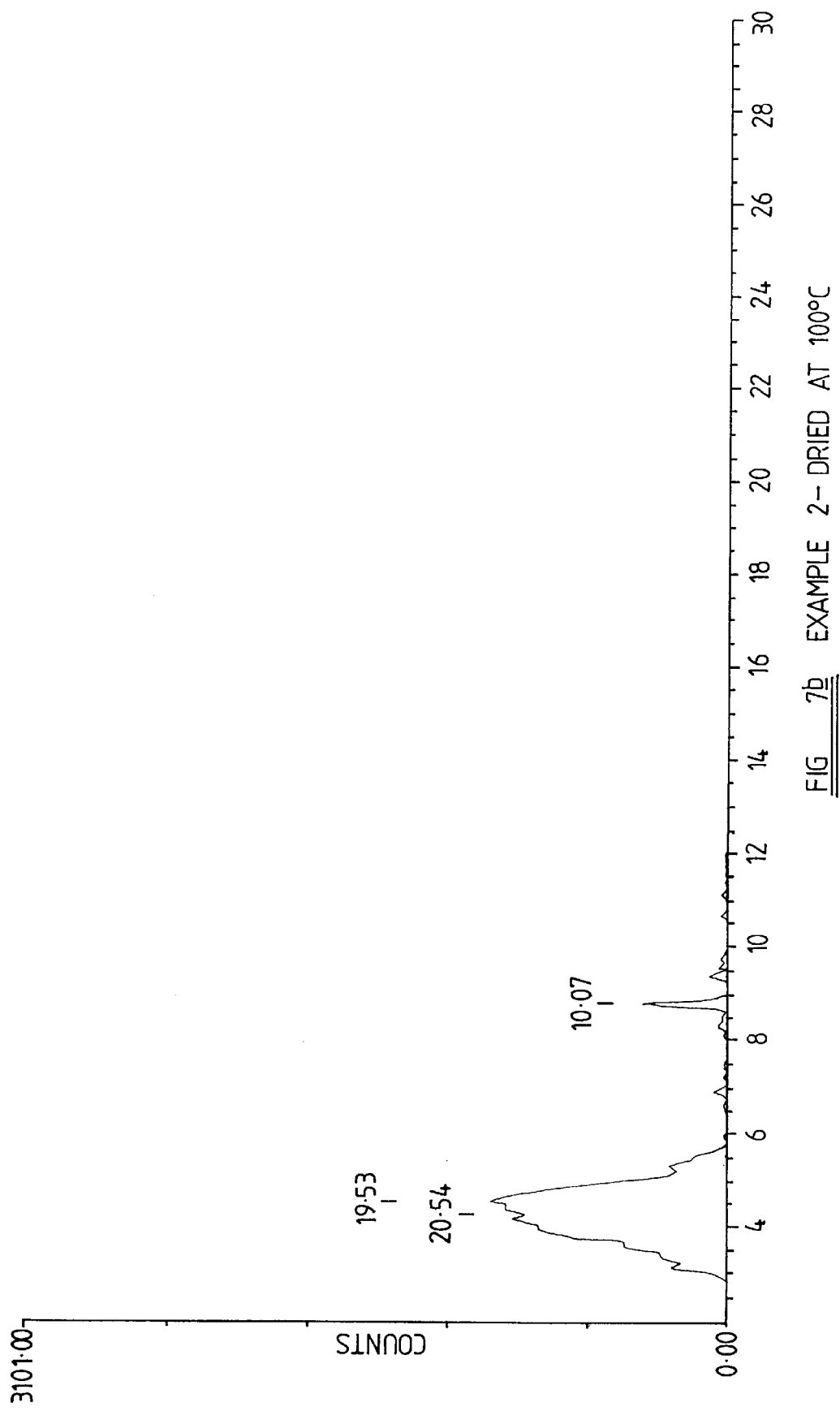
FIG 7b EXAMPLE 2- DRIED AT 100°C

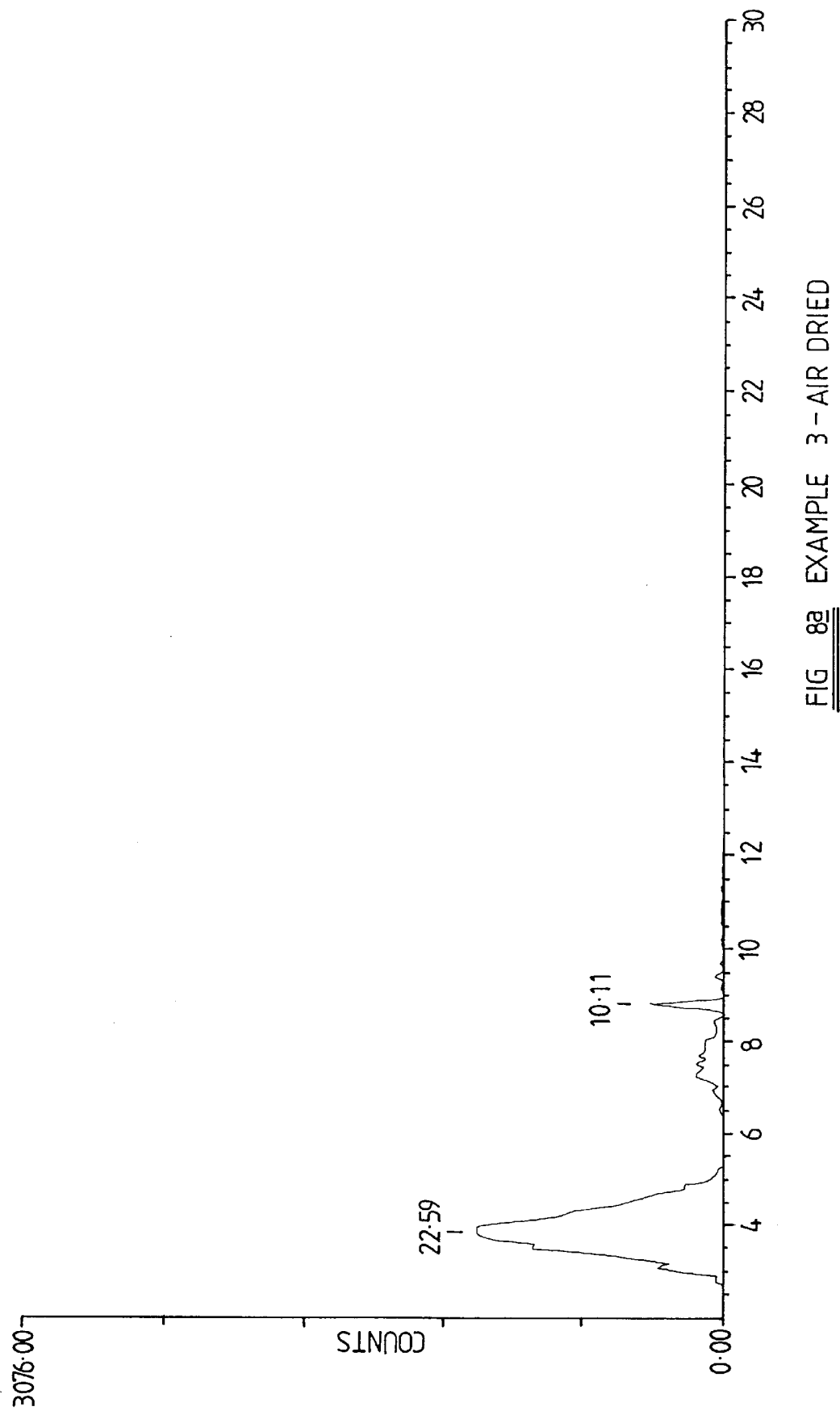
FIG 8a EXAMPLE 3 - AIR DRIED

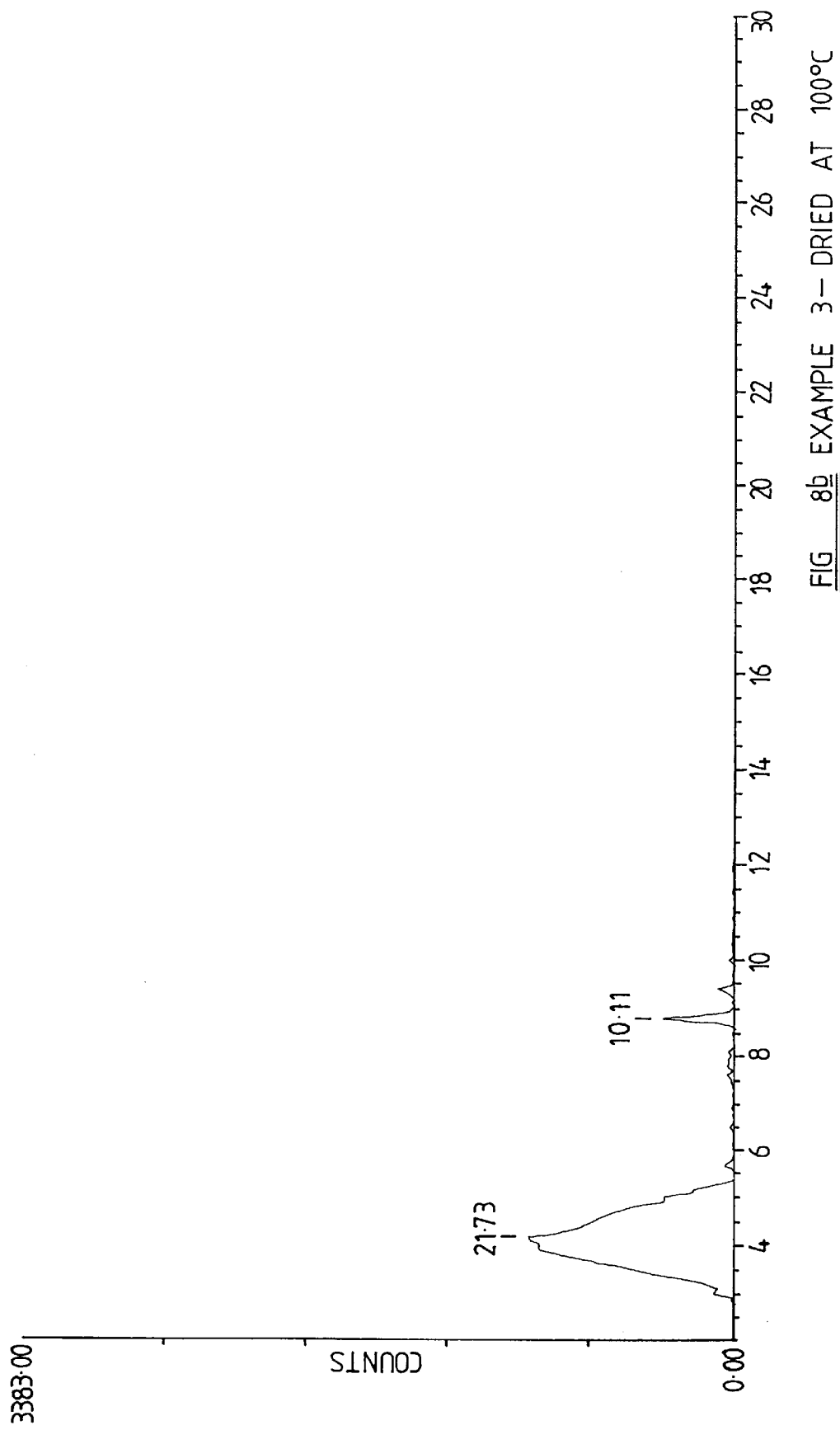
FIG 8b EXAMPLE 3 – DRIED AT 100°C

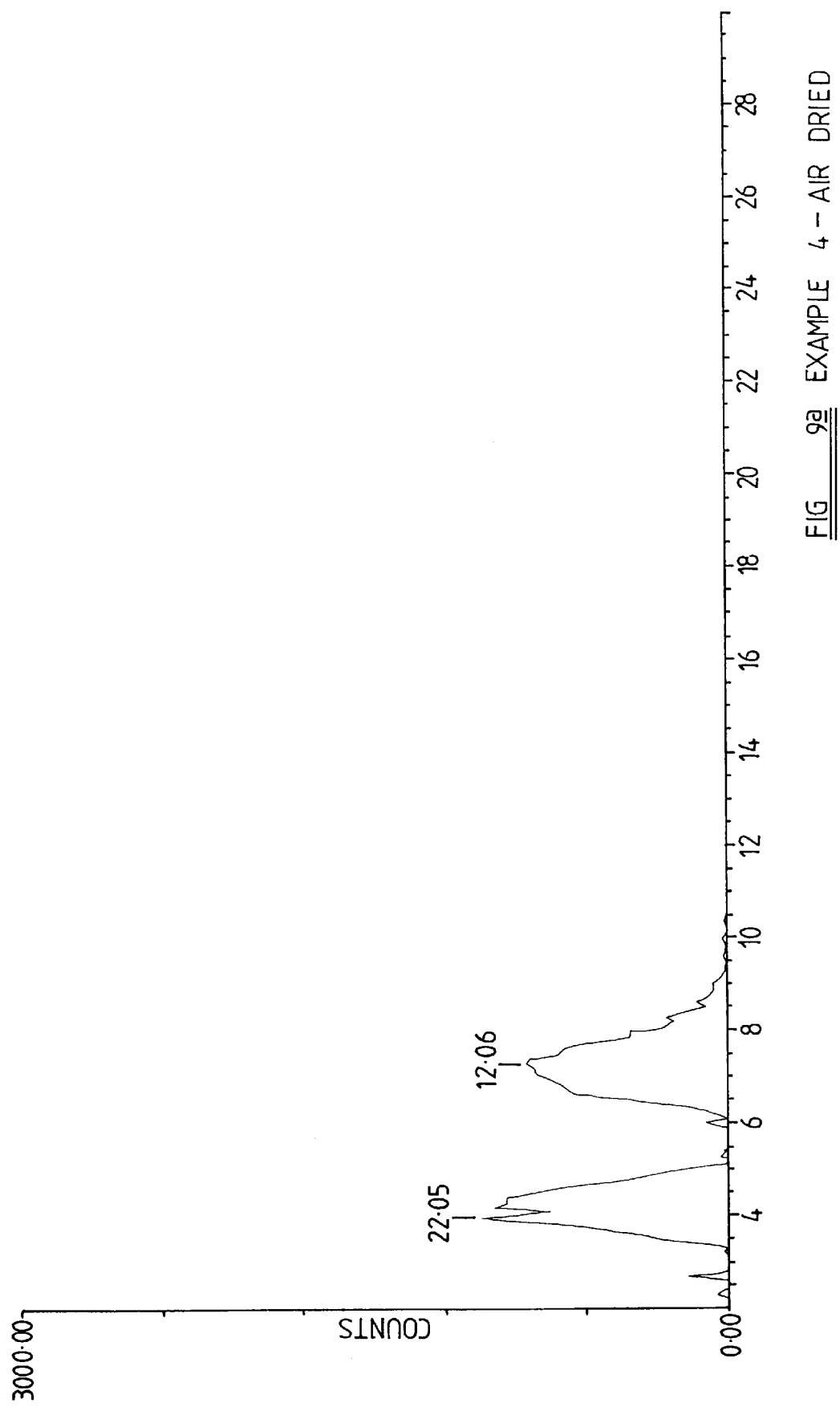
FIG 9a EXAMPLE 4 - AIR DRIED

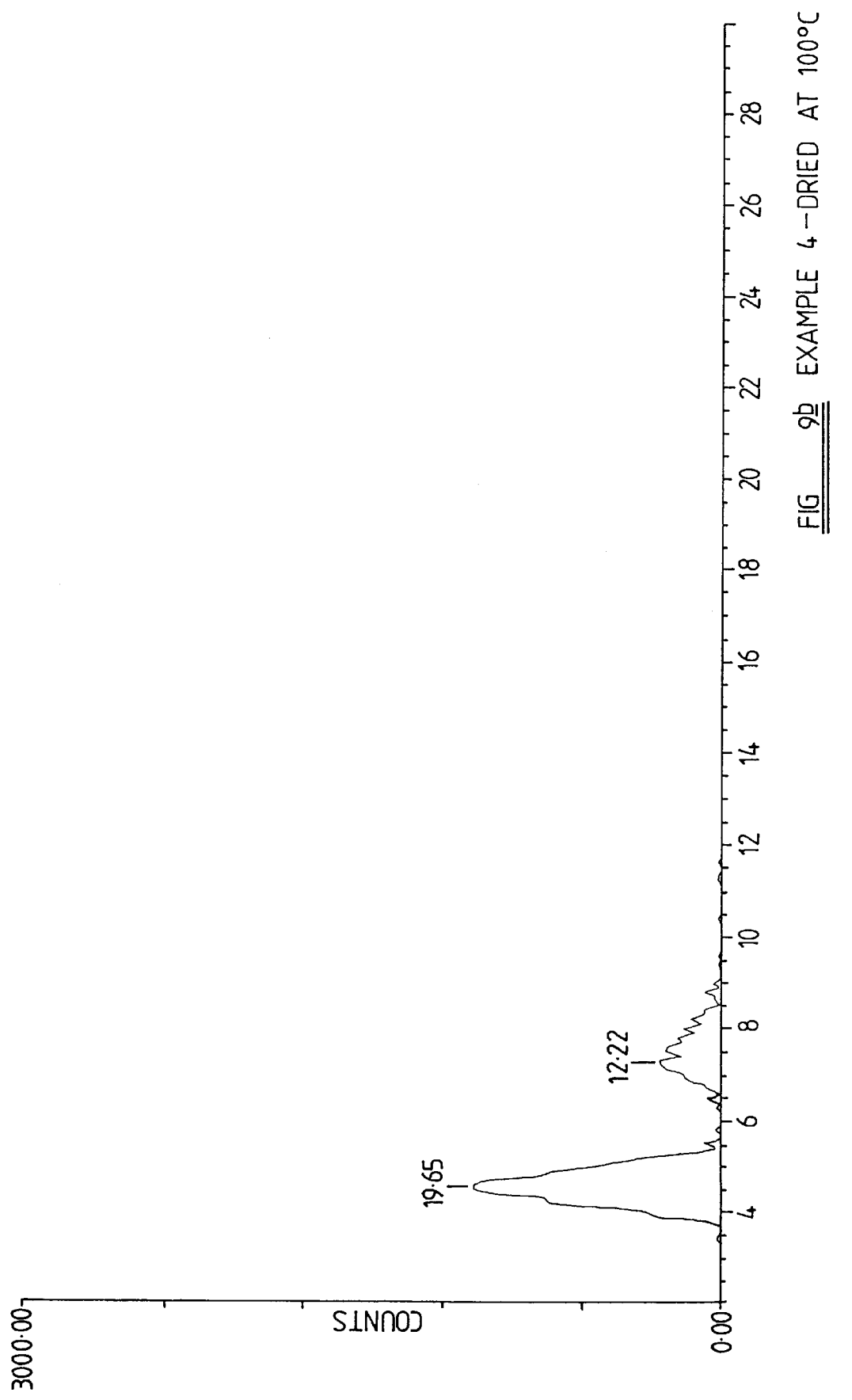
FIG 9b EXAMPLE 4 -DRIED AT 100°C

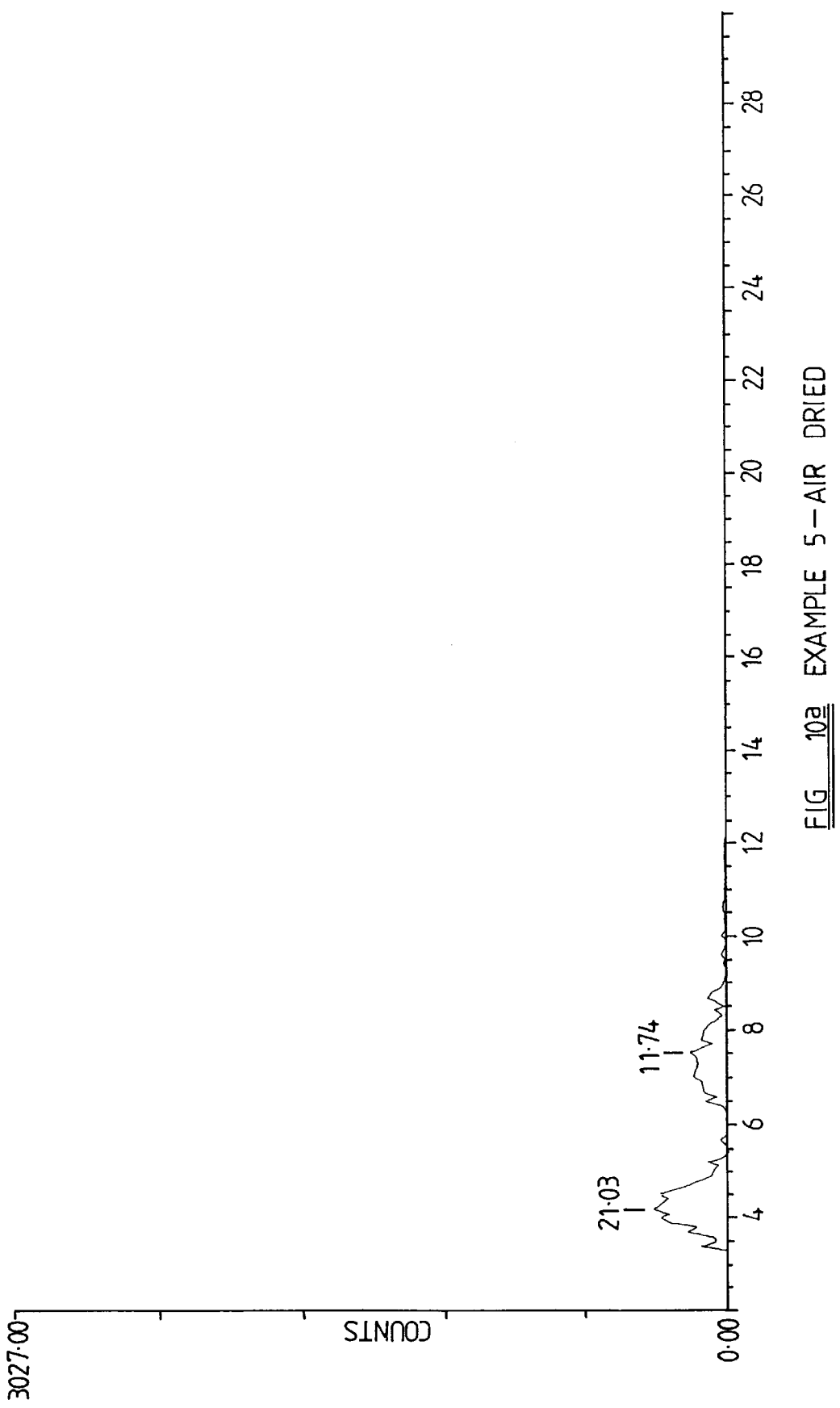

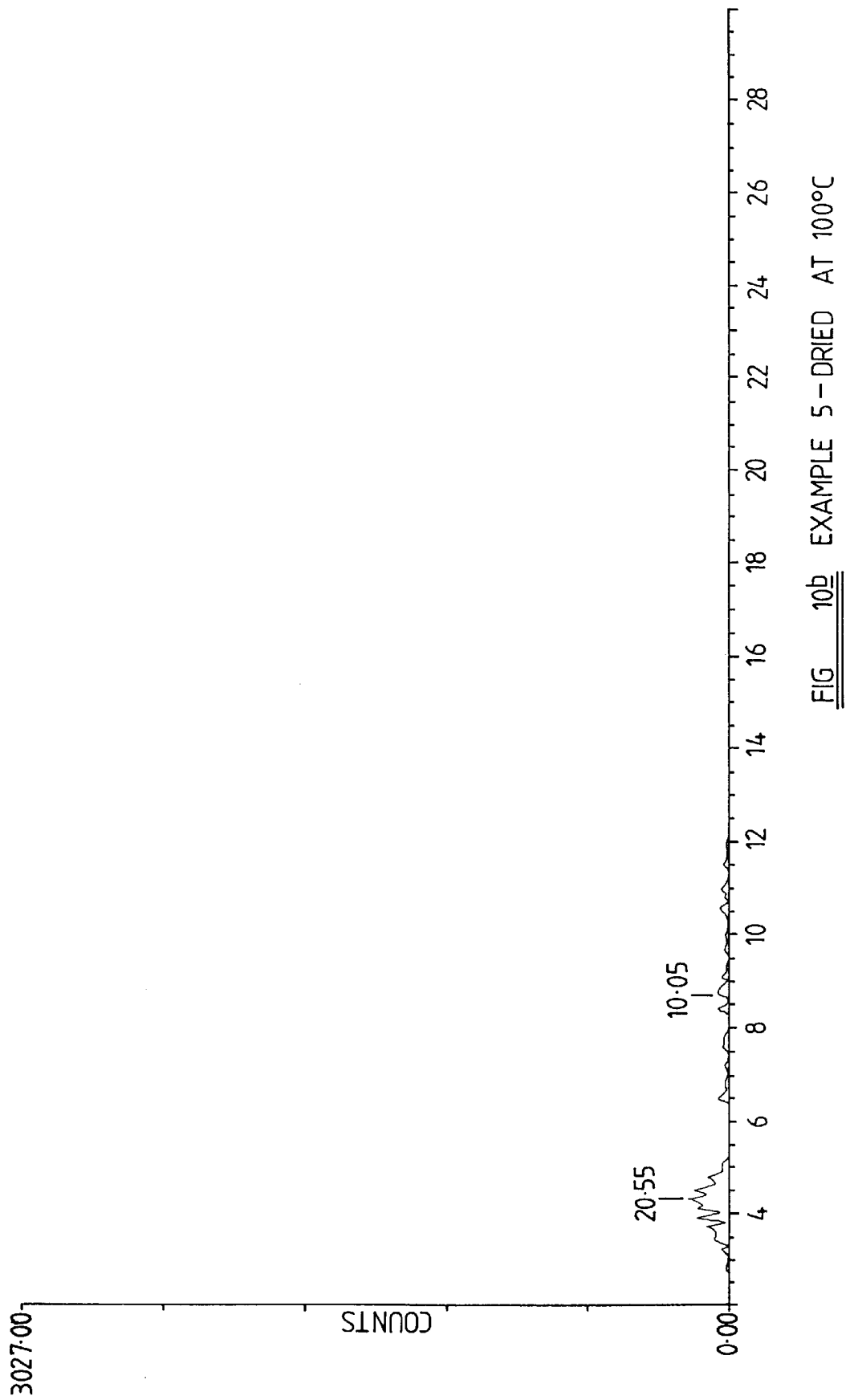
FIG 10b EXAMPLE 5-DRIED AT 100°C

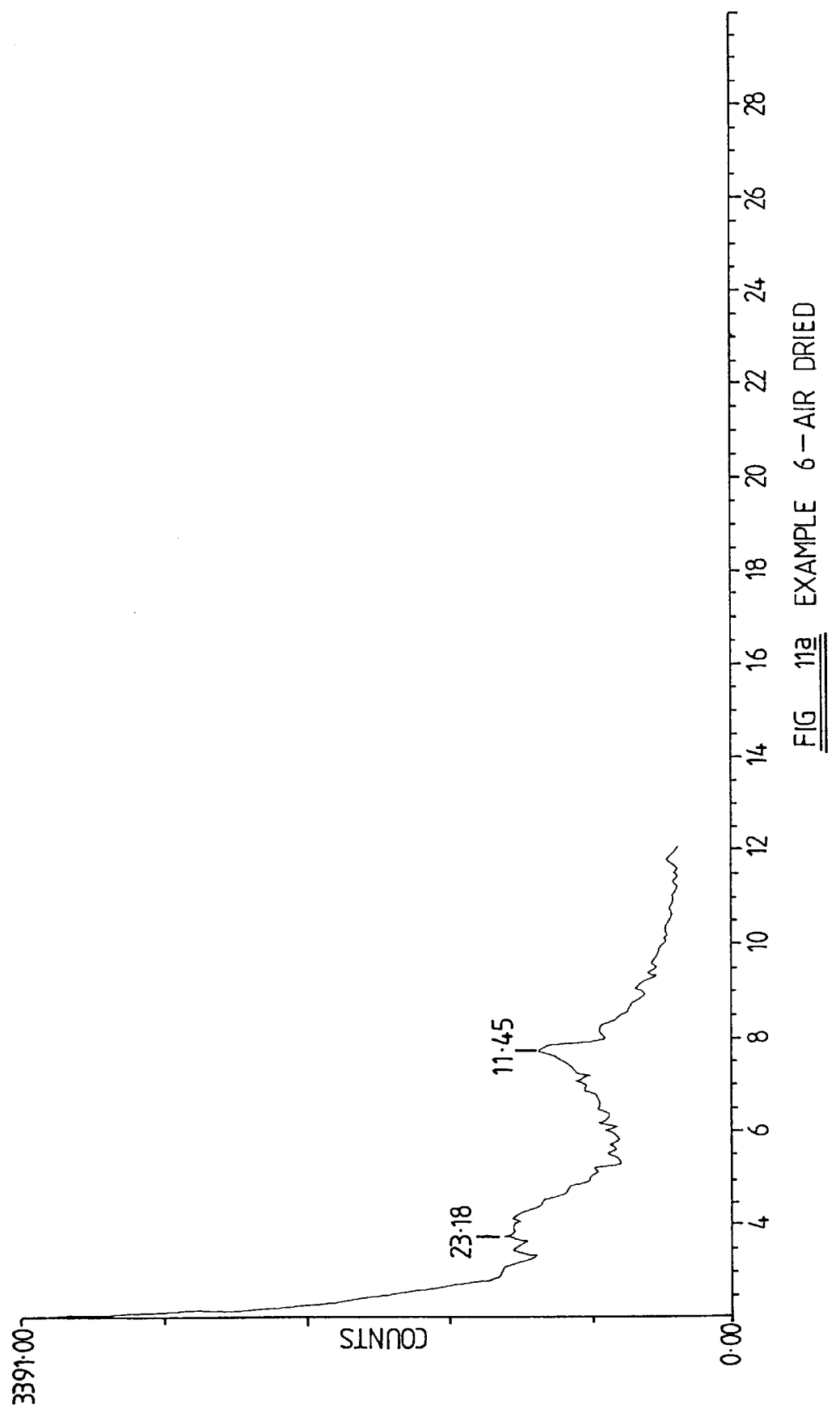
FIG 11a EXAMPLE 6-AIR DRIED

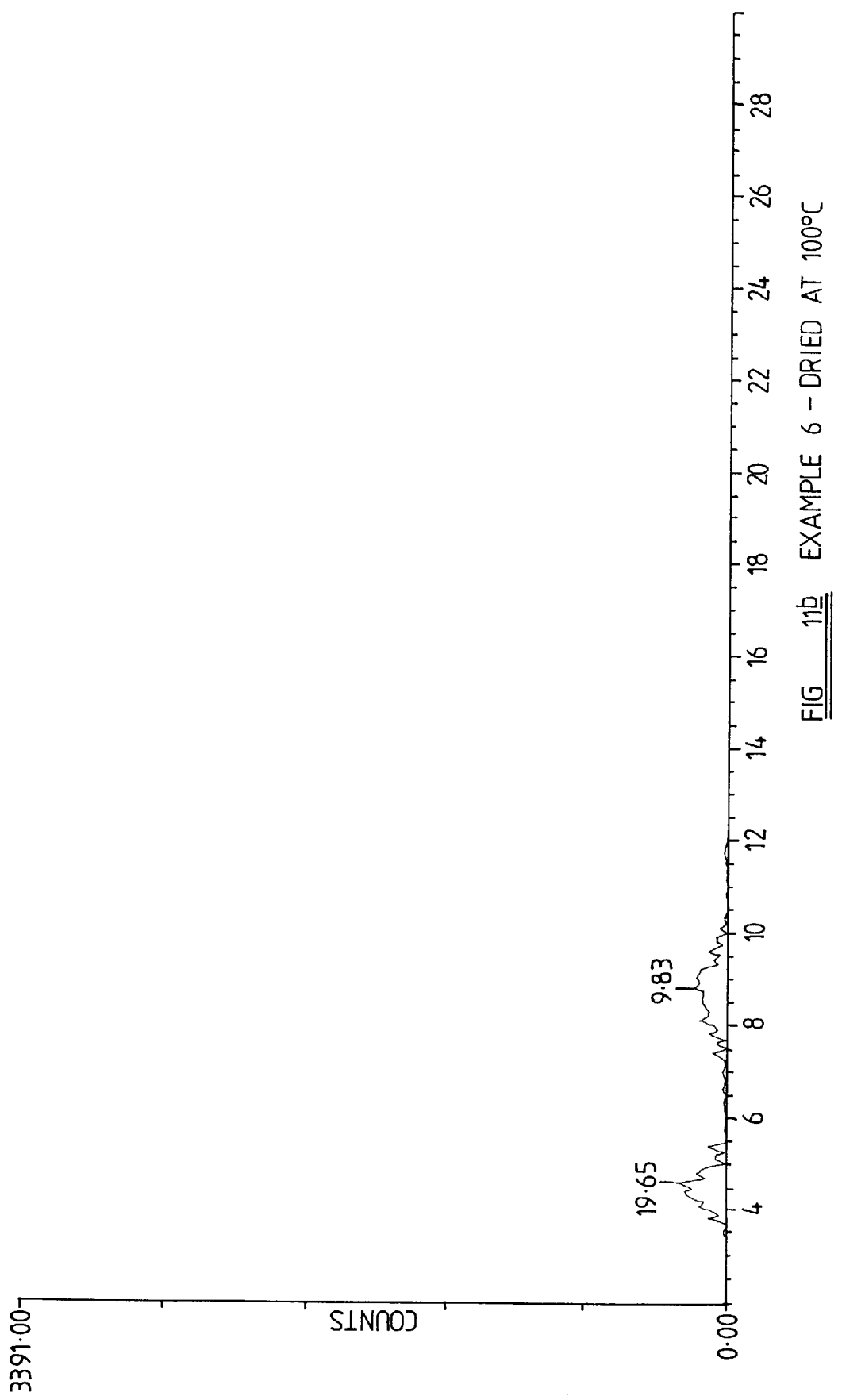
FIG 11b  EXAMPLE 6 – DRIED AT 100°C

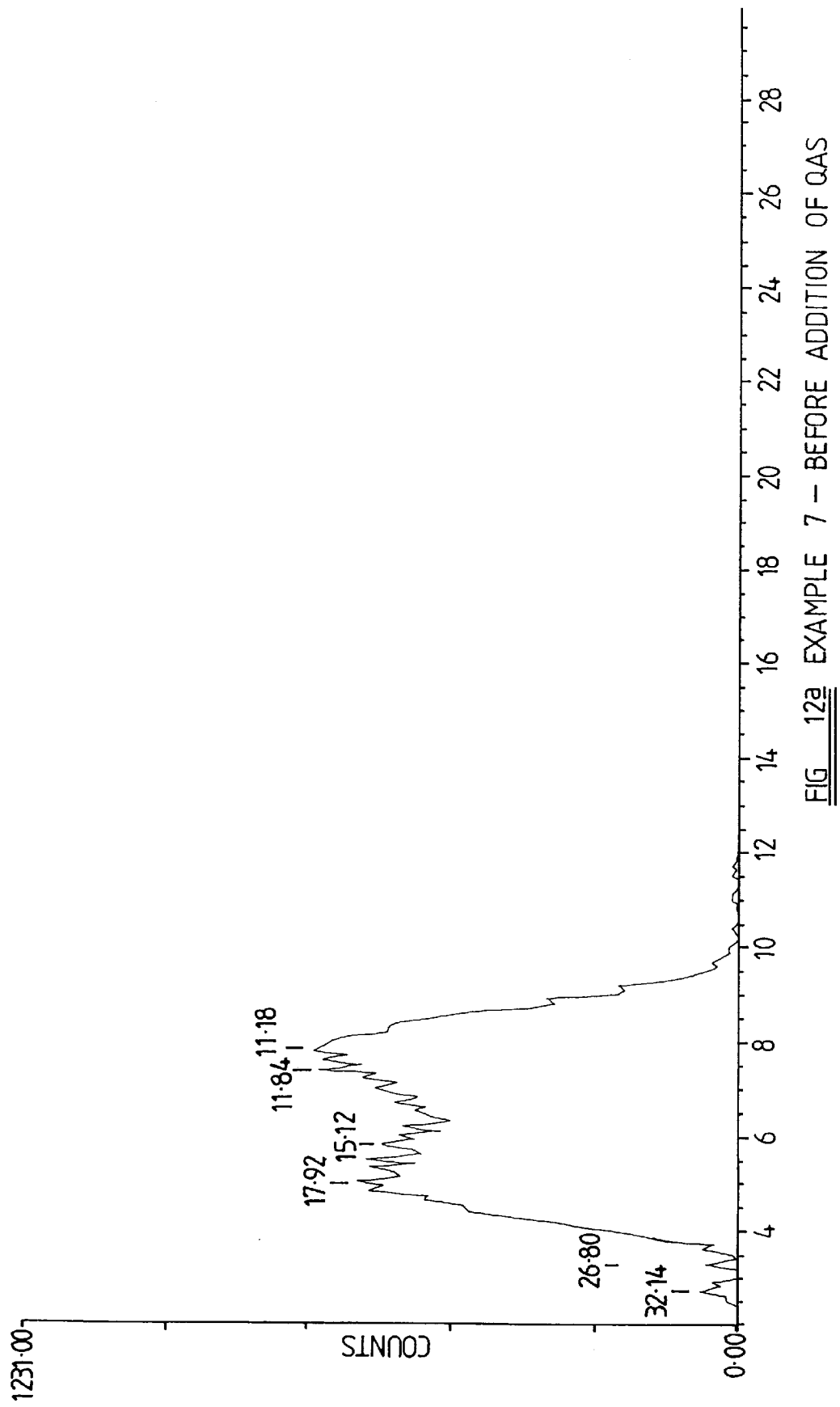
FIG 12a EXAMPLE 7 – BEFORE ADDITION OF QAS

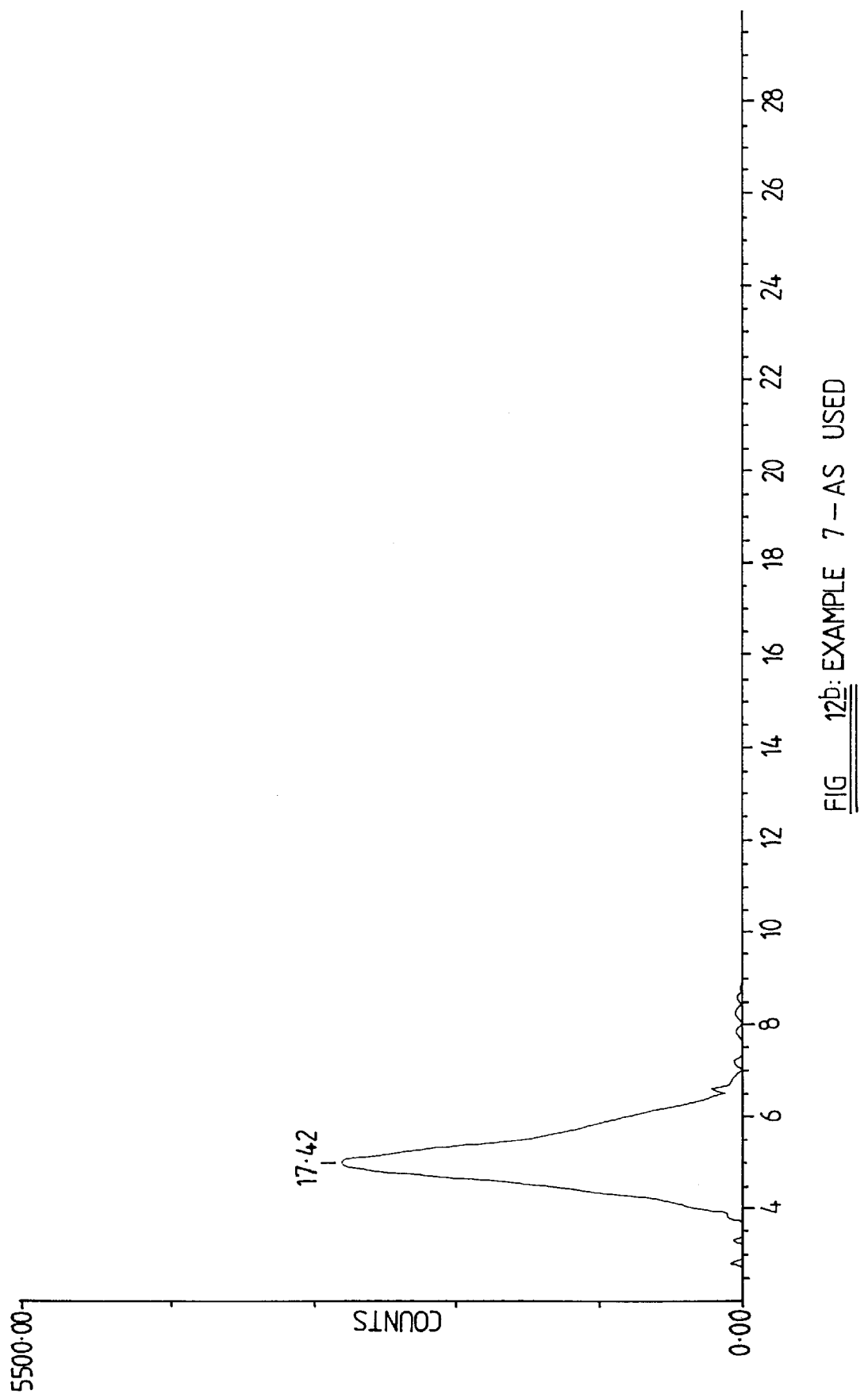
FIG 12b: EXAMPLE 7 - AS USED

MODIFIED ORGANOCLAYS

BACKGROUND OF THE INVENTION

This invention relates to the production and use of modified organoclays for the treatment of land, soil or other material, including water and air, contaminated by hazardous organic wastes.

The treatment of hazardous industrial waste containing inorganics and heavy metals using cementitious and pozzolanic materials has been practised for may years as a landfilling pre-treatment stabilisation/solidification process. It is now acknowledged that this technique is inappropriate for treatment of waste contaminated with organic materials due to reported detriment effects on cement hydration and structural formation.

In response to the need to develop a new generation of cost effective treatment technologies which can be successfully applied to low and medium-level organic wastes in addition to general inorganic wastes, leading specialist organisations in this field have endeavoured to address the inherent problem of organic interference in cement hydration reactions. The approach adopted in most cases has been to develop a range of specialist additives, with the capability of providing a linking mechanism between the organic waste material and the inorganic aluminosilicate matrix.

The use of organophilic clays, which are commonly employed in the paint, oil and related industries, has been evaluated as a pre-absorbent prior to solidification.

Commercial organoclays are typically quaternary ammonium salt (QAS) substituted phyllosilicates or smectite clays e.g. montmorillonite. Smectite clay minerals possess a combination of cation exchange, intercalation and swelling properties which make them unique. Smectites have layer lattice structures in which two dimensional oxyanions are separated by layers of hydrated cations. The oxygen atoms define upper and lower sheets of tetrahedral sites and a central sheet of a octahedral sites. This structural basis classifies smectites as 2:1 phyllosilicates.

The substitution of integral cations by lower valency cations induces an overall negative layer charge. In montmorillonite, for example, octahedral $Al^{3+}$ can be substituted by $Mg^{2+}$. Electroneutrality is maintained by the intercalation of hydrated alkali metal and alkaline earth cations. These cations are readily exchangeable and can be replaced by a wide range of positively charged chemical groups. The use of QAS is only one of the ways in which such clays can be modified to produce an organoclay; other neutral or polar molecules can also be intercalated.

A wide range of such organoclays is described in the patent literature for many purposes, but in particular, U.S. Pat. No. 4,740,488 describes a modified smectite clay developed for use as a sorbent in the removal of trace organic pollutants from process effluent streams. This clay uses aluminium hydroxide polymers as the pillaring agent and requires treatment with as much as a thirty-fold excess of solution of hydroxy-aluminium with the aim of ensuring that all exchangeable cations are replaced, i.e. the ion exchange capacity of the clay is saturated and, as explained by the inventors in a subsequent paper (Clay and Clay Minerals, Vol. 38 No. 3, 277–286, 1990) the polycations at the cation exchange sites of the clay are not exchangeable. Moreover, subsequent addition of QAS does not displace hydroxy-aluminium, being simply additive, because the ion exchange sites are blocked by the hydroxy-aluminium.

This contrasts with the modified clay of the present invention as hereinafter described, which has been developed primarily for the purpose of the treatment of land contaminated by organic pollutants, but also for other possible uses.

SUMMARY OF THE INVENTION

According to a first aspect of the invention we provide a modified organoclay having organophilic properties and which is treated by a pillaring agent and a salt of a transition metal in quantities corresponding to no more than 100% stoichiometric exchange of the exchangeable cations of the clay.

Preferably, the pillaring agent creates inerlamellar spacing sufficient to provide access for larger molecules such as polychlorinated biphenyls and polyaromatic hydrocarbons, and for this purpose the inerlamellar spacing $d_1$ is preferably at least 15 Å ($15 \times 10^{-10}$ m).

The pillaring agent may comprise an aluminium or other metal hydroxide polymer, or transition metal clusters, or appropriate silicon or titanium oxides.

In particular the clay may include intercalation additives comprising a combination of an aluminium hydroxide polymer, a quaternary ammonium salt and a salt of a transition metal.

As compared with the modified smectite clay of U.S. Pat. No. 4,740,488, the clay in accordance with this invention requires the usage of much smaller quantities of aluminium hydroxides, since only part of the ion exchange capacity is taken up by aluminium hydroxide polymers. Part of the ion exchange capacity is also taken up by readily available quaternary ammonium salts and another part by readily available and generally relatively inexpensive transition metal salts, particularly ferric salts, whilst preferably leaving part of the ion exchange capacity available. Accordingly, the clay in accordance with the invention is significantly different in constitution from that disclosed in U.S. Pat. No. 4,740,488, both in its structure and more particularly in its ion exchange capabilities.

The organophilic properties can be achieved by the use of suitable quaternary ammonium salts or other molecules as indicated above.

Expansion and swelling of the inter-lamella spaces provides a means for intercalation of larger molecular structures. The degree of inter-lamella swelling is a function of the layer charge (which varies according to the mineral type and level of integral cation substitution), the location of the layer charge (delocalised with octahedrally substituted smectite clays such a montmorillonite) and the type of cation used in the intercalation exchange process. By using different QAS for example, the degree of organophilic/hydrophobic character and intercalation properties can be varied depending on the length and polarity index of the aliphatic chains and potential reactivity of any substituted aryl groups provided in the selected QAS.

Pillared clays have been developed with the ability to withstand excessive dehydration without loss of stability. The pillars act as molecular props in the absence of other intercalation solvents or chemicals thereby retaining the basal separation within the inter-lamellar structure. The pillars are formed by the addition of agents which become bonded to the lamellae. Such pillared clays have been used extensively in catalysis and are constantly under development with a view to improving the range of products and process applications.

The iron or transition metal salts provide the required active sites, but the introduction in accordance with the invention of other pillaring agents, including inter alia transition metal complexes, heteropoly acids and organometallic cations will further enhance the reactivity of the interlamellar spaces. These additives are commonly used in solid acid catalyst manufacture for petroleum refining and associated processes.

Smectite clays which have been exchanged with strongly oxidising transition metals e.g. $Cu^{2+}$, $Fe^{3+}$ and $VO^{2+}$ in non-hydrated form, have been shown to be highly reactive, with the capability of stripping electrons from neutral organic molecules thereby transforming the substrate molecule into a reactive cation which subsequently interacts with other organic molecules forming breakdown products and in some cases, long chain polymers which are then physically entrapped within the matrix.

Substituted ferric ions ($Fe^{3+}$) are commonly found in certain montmorillonites. Where specific catalytic action is essential e.g. in petroleum refining, this is regarded as a disadvantage as the transition metal character and oxidising capability can cause generally unwarranted side reactions. However, in environmental applications where reactivity is generally non-specific, the presence of $Fe^{3+}$ in the octahedral spaces can induce additional interlamellar reactivity through electron transfer via delocalised electrons.

Aluminium ions are often substituted for $Si^{4+}$ ions in relatively small amounts in the tetrahedral layer. As with the substitution of $Fe^{3+}$ ions in the octahedral layer, the degree of substitution varies considerably depending on the source of raw material. The presence of $Al^{3+}$ ions in the zone adjacent to the interlamellar space provides effective sites for Lewis acid/base reactions with chlorinated hydrocarbons and other substituted organics. The potential for covalent bonding (Lewis/Bronsted reactions) can be enhanced by the introduction of transition and non-transition metal clusters and other suitable reactive media e.g. polynuclear hydroxy aluminium ions. One well documented example of an interaction between transition metals and neutral organic molecules is the formation of dibenzene compounds e.g. $C_6H_6CrC_6H_6$ in which the aromatic groups form ligand complexes with the respective transition metal by means of overlapping delocalised aromatic pi orbitals and unoccupied metal d orbitals. The stability of the complex depends on the transition metal utilised. Commercial QAS organoclays have been shown to be less effective in treating pure hydrocarbons such as benzene due to limited reactivity.

Numerous other forms of chemical bonding and reactions can occur within the interlamellar spaces ranging from Van Der Waals attraction forces and dipole effects to full covalent bonding and/or molecular alteration (e.g. Friedel Crafts and Diels Alder reactions). Treatment of mixed wastes requires the application of multiple reaction and treatment techniques. Modified intercalated Smectite clays can provide an effective treatment media.

The pragmatic use of selected intercalation additives will significantly enhance the potential reactivity of organoclays and broaden the range of organic waste materials which can be treated by this process.

As mentioned above, organoclays have been evaluated as pre-absorbents prior to conventional cement based solidification processes. The major disadvantage of using pure commercial organoclays is their relatively high cost and limited reactivity.

The invention provides a range of modified inorgano-organoclays in which the prime function of the intercalated moieties is to provide an effective mechanism for attracting organic compounds into the interlamellar spaces and therein retaining the substrate material in a stationary phase in close proximity to other intercalated reactants. This is essentially a multi-function viz:

(a) pillaring to create adequate interlamellar spacing to provide access for larger molecules e.g. polychlorinated biphenyls (PCB) and polyaromatic hydrocarbons (PAH);

(b) organophilic attraction of like polarity organic compounds;

(c) providing a reactive environment in which the organic substrates can be permanently bonded to the clay surfaces and pillaring agents.

The invention also resides in a method of treating soil or other similar materials contaminated by hazardous organic molecules, comprising formulating a modified organoclay including one or more selected organophilic materials and one or more pillaring agents, and one or more transition metal salts, to provide a modified organoclay tailored to interact with the contaminant organic molecules to be treated, and then treating the contaminated material with such modified organoclay and a binding agent to form a substantially stable mass of material in which the contaminant is retained in a substantially less-hazardous condition.

A wide range of QAS compounds of varying polarity is commercially available and the appropriate QAS can be applied for a specific waste treatment scenario. Speciality QAS can also be synthesised with amphipathic properties e.g. R1–R3 medium chain aliphatics typically hydrophobic; R4 substituted aryl group with hydrophillic properties.

By selective use of available smectite clays and intercalation of appropriate QAS in conjunction with relatively low cost reactants (principally Fe/Al compounds), it is believed to be possible to produce highly efficient and multi-functional treatment media which can be applied on a cost effective basis. The modified organoclay will constitute a key element in the overall chemical fixation/solidification strategy in combination with conventional cementitious and pozzolanic additives.

The use of lime-based pozzolans should generally be avoided due to reported problems with exothermic volatilisation of volatile and semi-volatile organic compounds. It has been recently observed that azeotropic volatilisation can occur with excessive heats of hydration. Studies carried out on quickline processes treating PCB contaminated soils indicate copious losses to atmosphere of PCB congeners. Steam stripping trials have also verified that azeotropic volatilisation does occur. In this case, polynuclear aromatic hydrocarbons e.g. Chrysene (MP 255° C.; BP 448° C.) were detected in the extracted vapour. This is clearly unsatisfactory as a treatment concept.

One of the most important considerations is the need to ensure that injection and mixing processes are thorough and effective. The objective is to produce a homogeneous reactive media in which the waste contaminants are brought into direct contact with the additive mix.

It is believed that hydrophobic molecules will readily migrate into the organophilic interlamellar spaces within the modified inorgano-organoclays of the present invention. This effect will be most apparent when treating soils contaminated with extremely hydrophobic molecules such as PCB's, PAH's and dioxins. Other more polar molecules (e.g. phenolics) will react with transition metals to form ligand complexes etc.

Once intercalated, the reactive properties of the clay and the presence of reactive species will ensure that the waste contaminant is permanently bonded to the substrate material. Addition of pozzolans will seal the pores of the substrate material. The chemically immobilised material can then be solidified by various conventional techniques including cement hydration for example.

Treatment of contaminated soils in this way provides a permanent solution to the treatment of organic waste materials and involves positive chemical bonding phenomena in addition to absorption processes. It can be applied in waste treatment scenarios on a cost effective basis as a complementary process to bioremediation and soil separation/soil washing techniques.

The invention is described more specifically hereinafter with reference to a number of Examples, but can be more readily appreciated in view of the following back-ground material.

A—Structure of Smectite Clays

Smectite clay minerals have layer lattice structures in which two-dimensional oxyanions are separated by layers of hydrated cations. The members of the smectite group of clays are distinguished by the type and location of cations in the oxygen framework. In a unit cell formed from 20 oxygens and 4 hydroxyl groups there are 8 tetrahedral sites and 6 octahedral sites. When two-thirds of the octahedral sites are occupied by cations, the mineral is classified as a dioctahedral 2:1 phyllosilicate. A trioctahedral 2:1 phyllisilocate has all octahedral sites filled by cations.

In montmorillonite, the most familiar and common member of the smectite groups, a negative layer charge arises from the substitution of octahedral $Al^{3+}$ by $Mg^{2+}$. Electroneutrality is maintained by the intercalation of hydrated alkali metal and alkaline earth cations. The layer charge in octahedrally charged smectites is distributed over all oxygens in the framework.

Saponite is an example of a trioctahedral 2:1 phyllosilocate with predominantly $Mg^{2+}$ in the octahedral layers where ta negative charge arises from the substitution of tetrahedral $Si^{4+}$ by $Al^{3+}$. This charge effect is partially compensated by substitution of trivalent cations in the octahedral layer.

B—Chemical Composition of Montmorillonites

Montmorillonites are classified as dioctahedral 2:1 phyllosilicates. Dioctahedral smectites can be subdivided chemically into the predominantly aluminium varieties, montmorillonite and beidellite, and the iron-rich variety, nontronite.

Montmorillinites are distinguished from beidellites on the basis of the site of the negative charge on the layers. The ideal structural formula for a typical montmorillonite is:

$(Al_{3.15}Mg_{0.85})$ $(Si_{8.00})O_{20}(OH)_4X_{0.85}nH_2O$ where X represents the intercalated hydrated cation.

Aluminous montmorillonite smectite clays can be divided chemically into 3 types viz:

1. Wyoming type, characterised by a layer charge of less than 0.85 per $O_{20}(OH)_4$ (analyses 1–5 in table 1.15).
2. Otay type, with layer charge greater than 0.85 and less than 15% of the charge attributable to tetrahedral substitution (analyses 6–8 in table 1–15).
3. Tatatila and Chambers type, with layer charge greater than 0.85 and 15–50% of the charge attributable to tetrahedral substitution (analyses 9–12 in table 1.15).

C—Intercalation Additives

The prime objectives of intercalation in accordance with the invention are:

1. Pillaring to create adequate interlamellar spacing (to provide access for larger molecules e.g. PCB's and PAH's).
2. To create an organophilic environment of varying polarity to attract organics into the interlamellar spaces by absorption.
3. To provide a reactive environment in which the organic substrates can be permanently bonded to the clay surfaces and pillaring agents.

In commercial organoclays, the intercalation additive is typically a quaternary ammonium salt. These have limited reactivity due to the selective nature (i.e. polarity index) of the QAS.

It is now possible to intercalate pillaring agents comprising inorganic cations based on a form of polynuclear hydroxy metal ion. These cations induce additional reactivity due to the inherent chemical nature of the cation and the availability of Lewis acid sites (e.g. Al).

Other pillaring agents which may be used include transition metal clusters and specially developed silicon and titanium oxides. In the vast majority of cases to date, research has been targeted at the development of more efficient and cost effective catalysts. The extent of pillaring is an important consideration when treating soils contaminated with larger organic molecules e.g. PAH's. The early forms of pillared clays based on zeolites were size and shape selective due to the restrictive pore sizes of zeolite. It is the unique quality of smectite clays (i.e. the ability to expand) which enables the development of pillared clays with substantial interlamellar distances.

The use of transition metals provides an opportunity to enhance the reactivity of the interlamellar zone. The catalytic properties of transition metals is well known; these metals can be utilised to act as bonding agents by formation of ligand complexes and/or can act as catalysts in the reaction process. The interlamellar zone provides an ideal environment for catalytic activity. If transition metals are combined with other pillaring agents/reactive species, then a multi-purpose reactive clay can be produced with a capability to deal with a broad range of organics.

The use of transition metals in chemical bonding scenarios can be illustrated by the formation of ferrocene $(C_5H_5)_2Fe$ and dibenzenechromium $(C_6H_6)_2Cr$, and transition metal ligand complexes with polar organics (e.g. phenol).

D—Reactivity of clay surfaces

The smectite clay surface contains a number of reactive sites with the capability to react with organics in a number of chemical bonding scenarios. The present of aluminium ions in the tetrahedral layer and the present of ferric ions in the octahedral spaces impart additional reactivity to the clay by Lewis acid and transition metal reactivity respectively.

The substitution of interlayer cations (e.g. $Na^+$, $Ca^{2+}$) by transition metal ions (e.g. $Fe^{3+}$, $Cu^{2+}$ etc) can impart additional reactivity to the clay and produce a highly reactive oxidising media in the absence of water of hydration. In these circumstances, protonation of organic molecules can occur, resulting in further reactions with the clay surface and/or interaction with other organic molecules resulting in polymerisation.

The presence of oxygen atoms in the surface layers provides opportunities for hydrogen bonding. The clay surface is particularly suited to bonding with organic molecules containing accessible chloride and nitrogen atoms. These have the potential to bond directly with electron deficient aluminium atoms through Lewis acid/base reactions. Providing the interlamellar spaces can be made hydrophobic i.e. by intercalating with organophilic cations, the clay mineral can be extremely effective in the absorption and fixation of chlorinated hydrocarbons, notably, PCB's and chlorinated dioxins.

Certain Smectite Clays including trioctahedral Saponite have substituted $Al^{3+}$ within the tetrahedral layer which has the potential to greatly enhance Lewis Acid clay surface reactivity.

Some basic examples of possible interactions between selected commonly occurring organics and the clay matrix are illustrated in FIGS. 1 to 5.

E—Partial Pillaring of Metal-Exchanged Montmorillonite

Partial pillaring of a montmorillonite smectite clay previously exchanged with reactive cations produces a highly catalytic clay surface and a reactive interlamellar space. The residual exchangeable cations should be located within the pillars in the vicinity of either the internal smectite surface and/or the pillar surface. These cations are therefore exposed and accessible to organic molecules diffusing in the porous interlayer network. The choice of pillaring agent will determine the depth of interlamellar spacing and accordingly, the type and size of molecule which can be absorbed into the reactive spaces. By increasing the depth of the interlamellar spacing ($d_1$) to the required distance and reducing the number of pillars (assuming regular distribution), the spacing between the pillars ($d_3$) can be increased allowing adequate two-dimensional spacing for absorption of both large and non-planar molecules. The reactive cations will be located in the $d_3$ spaces.

F—Comparison and Absorptive Capabilities of Modified Montmorillonites

Research studies published in the paper referred to above have been carried out on the treatment of selected organic pollutants in aqueous media by absorption onto modified montmorillonite clays. In particular, partition co-efficients have been evaluated for a number of recently developed modified clays, including inorgano-organo clays in which QAS are intercalated with inorganic cations (such as hydroxy-Al polyvalent ions), and Table 1 below shows comparative distribution (partition) coefficients for benzo (a) pyrene (a typical hydrophobic polyaromatic hydrocarbon) in the presence of selected modified clays in aqueous media.

TABLE 1

Binding of benzo(a)pyrene on modified montmorillonite and activated carbon.[a]

| | Sorbent[b] | Distribution Coefficient[c] × 10 (dm³/kg) |
|---|---|---|
| 1. | CPC-hydroxy-Al montmorillonite | 95.8 |
| 2. | CPC-La-montmorillonite | 84.1 |
| 3. | CPC-montmorillonite | 48.9 |
| 4. | Activated carbon (Filtrasorb 400) | 38.6 |
| 5. | Hydroxy-Al montmorillonite | 20.5 |
| 6. | La-montmorillonite | 15.5 | a. Sorbent concentration = 0.25 g/dm³; initial benzo(a)pyrene concentration = 0.2 ppb.
b. CPC = cetyl pyridinium chloride.
c. Distribution coefficient is the ratio of the surface ($\mu$g/kg) to the solution phase ($\mu$g/dm³) concentration of the pollutant at equilibrium.

The organoclays and organo-inorgano clays (Nos. 1,2,3,5 and 6 in Table 1) exhibit strong absorption of benzo(a) pyrene. The organo-inorgano clays (IOC's) (Nos. 1 and 2 in Table 1) show exceptional binding capabilities; the metal exchanged IOC (No. 2 in Table 1, namely CPC-La montmorillonite) is very effective, and the pillared IOC (No. 1 in Table 1, namely CPC-hydroxy-aluminium montmorillonite) is shown to be most successful in binding benzo(a)pyrene.

The pillared IOC (No. 1 in Table 1) was however, produced by pillaring in the manner described in U.S. Pat. No. 4,740,488 previously mentioned, requiring a vast excess of aluminium hydroxide polymer, and the QAS (i.e. CPC) subsequently added is bound by direct addition not by ion exchange since the ion exchange capacity of the clay is saturated by the aluminium hydroxide polymer. Moreover, it should be noted that lanthanum as used in clays 2 and 6 in Table 1 is not a transition element as required by the present invention, because it does not exhibit multiple valency states (although for the purposes of the Periodic Table lanthanum is sometimes classified as a transition element).

The potential reactivity of the clay can be enhanced in accordance with the invention by the introduction of appropriate reactive species. The IOC's are clearly more effective in the absorption of hydrophobic molecules than pure organoclays (despite having a lesser organophilic nature). The intercalation additives used in the invention need to be varied depending on the type and nature of organic waste substrate. Ideally, the invention can provide a multifunctional clay with a broad range of treatment capabilities, taking into account inter alia size and polarity of the targeted organic waste groups. This is the prime technical objective of the present invention.

Modified organo clays in accordance with the invention may be designed specifically for the treatment of various organic groups, including:

1. PCB's, dioxins; chlorinated hydrocarbons.
2. PAH's.
3. Heterocyclic compounds.
4. Neutral organics; aryl and alkyl compounds.
5. Polar organics.

The process mix formulations for each clay address the treatment requirements for each organic group, taking into account chemical and physical properties. A general summary of the approach in each case is given below.

1. PCB's, Dioxins; Chlorinated Hydrocarbons

These molecules are extremely hydrophobic and will be readily absorbed by organophilic clays. Provisional research work has already been carried out on PCB's and dioxins using modified inorgano clays.

All chlorinated forms have the potential to bond with Lewis acid sites on the clay surface and on intercalated hydroxy-Al ions.

The aim is to formulate partially pillared clays with reactive sites, particularly inorgano-organo clays such as QAS/Hydrox-y-Al (or similar).

2. Polynuclear/Polycyclic Aromatic Hydrocarbons (PAH's)

By way of example several commonly occurring polynuclear aromatic hydrocarbons (fused ring and substituted fused ring compounds) that may be treated in accordance with the invention are listed below:

| | |
|---|---|
| Naphthalene | 1-Naphthalenesulfonic acid |
| 1,4-Dihydronaphthalene | 2-Naphthalenesulfonic acid |
| Tetralin | 1-Naphthol |
| cis-Decalin | 2-Naphthol |
| trans-Decalin | 1,4-Naphthoquinone |
| 1-Methylnaphthalene | Anthracene |
| 2-Methylnaphthalene | 9,10-Anthraquinone |
| 1-Bromonaphthalene | Phenanthrene |
| 2-Bromonaphthalene | 9,10-Phenanthrenequinone |
| 1-Chloronaphthalene | Chrysene |
| 2-Chloronaphthalene | Pyrene |
| 1-Nitronaphthalene | 1,2-Benzanthracene |
| 2-Nitronaphthalene | 1,2,5,6-Dibenzanthracene |
| 1-Naphthylamine | Methylcholanthrene |
| 2-Naphthylamine | |

The simplest compounds within this group are the non-substituted fused ring structures of naphthalene, anthracene, phenanthrene and chrysene.

Other more complex PAH's have carcinogenic properties. These include benzo(a)pyrene (referred to above). Some of the most powerful carcinogens are derivatives of 1,2-benzanthracene, e.g.:

5,10-dimethyl-1,2-benzanthracene;

1,2,5,6-diabenzanthracene;

methylcholanthrene 3,4-benzpyrene and in particular the following which have been identified by the World Health Organisation as requiring priority in view of their carcinogenic nature:

Fluoranthene

Benzo 3,4 Fluoranthene

Benzo 11,12 Fluoranthene

Benzo 3,4 Pyrene

Benzo 1,12 Perylene

Indeno (1,2,3-cd) Pyrene.

The majority of these compounds are hydrophobic (to varying degrees) and will be readily absorbed by organophilic clays.

The non-substituted forms have no reactive groups and are unlikely to bond with conventional organoclays.

It is therefore necessary to formulate an organoclay with adequate pillaring incorporating transition metal reactive sites on the clay surface as exchanged metal ions. The QAS utilised in some standard organoclays may not induce adequate interlamellar $d_1$ spacing to accommodate larger PAH molecules. Also, the $d_3$ pillar spacing may not be sufficient. The requirement is to formulate partially pillared IOC's incorporating transition metal reactive sites.

3. Heterocyclic Compounds

Heterocyclic compounds comprise of ring structures containing more than one type of atom in addition to carbon.

In a number of heterocyclic compounds, the presence of other atomic species can provide a source of potential reactive sites, e.g. unshared nitrogen $Sp^2$ electron pair in the pyridine molecule which, for example, can participate in Lewis acid/base reactions with aluminium ions.

Commonly occurring heterocyclic compounds which may be treated in accordance with the invention are as follows:

| Pyrrole | Furan | Thiophene |
|---|---|---|
| Imidazole | Oxazole | Thiazole |
| Pyrazole | 3-Pyrroline | Pyrrolidine |
| Pyridine | Pyrimidine | Purine |
| Quinoline | Isoquinoline | Carbazole. |

The ring structure, electronic configuration and nature of the various heterocyclic compounds imparts varying chemical and physical properties. For example, pyridine is a much stronger base than pyrolle.

The requirement is to formulate a multifunctional organoclay with the capability of reacting in various forms with these compounds. The extent of pillaring will depend on molecular size. Smaller one-ring compounds will be accommodated more effectively in compact interlamellar spaces, and thereby brought in close proximity to reactive sites. Larger molecules may require more extensive pillaring in terms of $d_1$ and $d_3$. Other QAS formulations with substituted reactive groups (in particular substituted benzyl QAS) can be incorporated into the clay structure as reactive pillars. With larger heterocyclic compounds, the QAS hydrocarbon chain will need to be lengthened to increase $d_1$ interlamellar spacing.

Partial pillaring of transition metal exchanged montmorillonite, using a combination of substituted QAS and hydroxy-Al ions, should impart the necessary multi-functionality to accommodate a broad range of heterocyclic compounds.

4. Neutral Organics; Aryl and Alkyl Compounds

Neutral organics, e.g. benzene, do not react with conventional organoclays, as the process is effectively absorption only (with the possibility of subsequent desorption). The aim is therefore to introduce into the interlamellar spaces reactive species which can bond the molecule permanently into the clay structure. One example is the use of transition metals, as described above.

Conventional organoclays provide relatively poor bonding of absorbed benzene (in comparison to hexachloropentadiene, Parathion and 1,2,Dichlorobenzene, for example.

Aryl compounds, (i.e. derivatives of benzene, naphthalene etc.), are more able to react with atoms in the clay surface (or alternatively within the pillars) through functional groups. Depending on molecular size, the pillaring agent will be an appropriate QAS in conjunction with transition metal hydroxides.

With alkyl compounds, only limited pillaring is necessary to physically accommodate these molecules; the scale and nature of pillaring will depend on the type of alkyl compound under consideration. It may be sufficient to utilise short chain QAS in conjunction with transition metal clusters on a metal exchanged montmorillonite clay.

5. Polar Organics

Organic molecules containing polar groups inherently require a different approach to other organics which are typically hydrophobic. The presence of hydroxide groups will, in most cases, induce hydrophilic properties which will not be conductive to absorption by strongly organophilic clays.

Aromatic polar compounds can be represented by phenols, such as the following:

| Phenol; | o-Chlorophenol; |
|---|---|
| m-Cresol; | p-Hydroxybenzoic acid; |
| Catechol; | Resorcinol; |
| Hydroquinone; | Salicylic acid. |

The solubility of phenols varies considerably depending on the functional group and type of phenol. The objective in this case is to formulate a modified montmorillonite clay with limited organophilic properties which can absorb the phenolic compound effectively into the interlamellar space. Once intercalated, there is every probability that the phenol will be effectively bonded to the clay structure through conventional hydrogen bonding. Pillaring may be necessary for larger molecules. In this case, the prime pillaring agent will be inorganic in nature, e.g. hydroxy-Al; the QAS content will be relatively low (mildly organophilic).

The preparation of modified clays is illustrated in the following specific examples. In these examples: MB 300 Bentonite is a partially sodium-exchanged calcium bentonite obtained by mixing the clay with dry sodium carbonate. DMHTB75=tallow benzyldimethylammonium chloride 2HT75=ditallow dimethylammonium chloride

EXAMPLE 1

(comparison—aluminium pillared clay, QAS DMHTB 75 exchanged)

1. 50 g of MB300S bentonite was dispersed in c. 1.5 L of distilled water (pH 11.0); pH adjusted to 7.5 with 1:1 HCl.

2. 75 ml of aluminium chlorhydrol as pillaring agent was diluted to c. 1 L with distilled water (pH 4.1).
3. clay suspension added in c 100 ml aliquots to 2 with mechanical stirring and allowed to stand for c. 2 hours (pH 4.4) and then kept at c. 72° C. for c. 1 hour.
4. Clear supernatant was decanted and the residue of pillared clay was filtered (filter pump) and washed twice with hot distilled water.
5. c. 40 g aliquot (with c. 13 me-40% of exchange capacity) of the pillared clay was dispersed in distilled water; 5.4 g (10 me) of QAS DMHTB75 dissolved in c. 20 ml distilled water at c. 60° C. was added to clay with mechanical stirring.

EXAMPLE 2

(Aluminium pillared clay, $Fe^{3+}$ exchanged and DMHTB75 exchanged)

1–4. As for Example 1.
5. 0.9 g anhydrous $FeCl_3$ added to pillared clay redispersed in distilled water and allowed to stand overnight.
6. 5.4 g of QAS DMHTB75 was dissolved in c. 20 ml distilled water at c. 60° C. and added to clay suspension 5 with mechanical stirring.

EXAMPLE 3

(Clay exchanged with $Fe^{3+}$, Aluminium pillared and QAS DMHTB75 exchanged)

1. 50 g of MB 300S bentonite was dispersed in c. 1.5 L distilled water (pH 11.0) and the pH was adjusted to 7.5 with 1:1 HCl.
2. 1.9 g anhydrous $FeCl_3$ was added with mechanical stirring and left overnight; filtered (filter pump) and washed with distilled water until nearly Cl free.
3. 75 ml of aluminium chlorhydrol was diluted to c. 1 L with distilled water; clay 2 was resuspended in c. 1.5 L distilled water and added in c. 100 ml aliquots to chlorhydrol with mechanical stirring and allowed to stand for c. 2 hours before being kept at c. 72° C. for one hour. Clear supernatant was decanted.
4. 5.4 g QAS DMHTB75 was dissolved in c. 100 ml distilled water at c. 60° C. and added to 40 g aliquot of pillared clay suspension with mechanical stirring.

EXAMPLE 4

(Comparison—Aluminium pillared, and QAS 2HT75 exchanged)

1. 50 g of MB300S bentonite was dispersed in c. 1.5 L of distilled water (pH 11.0); pH adjusted to 7.5 with 1:1 HCl.
2. 75 ml of aluminium chlorhydrol as pillaring agent was diluted to c. 1 L with distilled water (pH 4.1).
3. clay suspension added in c 100 ml aliquots to 2 with mechanical stirring and allowed to stand for c. 2 hours (pH 4.4) and then kept at c. 72° C. for c. 1 hour.
4. Clear supernatant was decanted and the residue of pillared clay was filtered (filter pump) and washed twice with hot distilled water.
5. c. 40 g aliquot (with c. 13 me-40% of exchange capacity) of the pillared clay was dispersed in distilled water; 7.7 g (10 me) QAS 2HT75 dissolved in c. 100 ml distilled water at c. 100° C. (no true solution could be obtained but a waxy gel formed) and added to 40 g aliquot of the pillared clay suspension with mechanical stirring.

EXAMPLE 5

($Fe^{3+}$ exchanged clay, aluminium pillared and QAS 2HT75 exchanged).

1. 50 g of MB 300S bentonite was dispersed in c. 1.5 L distilled water (pH 11.0) and the pH was adjusted to 7.5 with 1:1 HCl.
2. 1.9 g anhydrous $FeCl_3$ was added with mechanical stirring and left overnight; filtered (filter pump) and washed with distilled water until nearly Cl free.
3. 75 ml of aluminium chlorhydrol was diluted to c. 1 L with distilled water; clay 2 was resuspended in c. 1.5 L distilled water and added in c. 100 ml aliquots to chlorhydrol with mechanical stirring and allowed to stand for c. 2 hours before being kept at c. 72° C. for one hour. Clear supernatant was decanted.
4. c. 40 g aliquot (with c. 13 me-40% of exchange capacity) of the pillared clay was dispersed in distilled water; 7.7 g (10 me) QAS 2HT75 dissolved in c. 100 ml distilled water at c. 100° C. (no true solution could be obtained but a waxy gel formed) and added to 40 g aliquot of the pillared clay suspension with mechanical stirring.

EXAMPLE 6

(Aluminium pillared clay, $Fe^{3+}$ exchanged and QAS 2HT75 exchanged)

1–4. As for Example 1.
5. 0.9 g anhydrous $FeCl_3$ added to pillared clay redispersed in distilled water and allowed to stand overnight.
6. 7.7 g (10 ne) of QAS D2HT7S dissolved in c. 100 ml distilled water at c. 100° C. (no true solution could be obtained but a waxy gel formed) and added to 40 g aliquot of the pillared clay suspension with mechanical stirring.

EXAMPLE 7

(Commercial scale production of Example 2)

The clay used was MB 300 S Bentonite, milled to a maximum particle size of 53 μm, obtained from Fordamin Industrial Minerals. The quaternary ammonium salt (QAS) used was Arquad DMHTB-75 (tallowbenzyldimethylammonium chloride), obtained from Akzo Nobel Chemicals. The chlorhydrol [$Al_2(OH)_5Cl.(2.5 H_2O)$] solution (50% in water) was obtained from Wilfrid Smith Ltd. The ferric chloride ($FeCl_3$) was used in solution (instead of anhydrous as in Example 2) namely 90 TW solution (40% in water) obtained from Farleyway Chemicals Ltd.

Bentonite clay (2.8. kg) was dispersed in hot water (84 L, approved 60° C.), contained in a steel drum (200 L capacity), using an immersion pump (Feka 600, pumping rate 14 $m^3 hour^{-1}$) for 30 minutes. After the clay had fully dispersed, concentrated HCl (92 mL) was added, as there is about 1–2% sodium carbonate present with the clay giving an alkaline suspension (pH 10–11). This was done to ensure the pH was between 7.0 and 7.5. In a separate steel drum, hot water (51.8 L.60° C.) and chlorhydrol (4.2 L) were mixed, and the solution kept at a temperature of approximately 65° C. by heating with an immersion heater (2 kW). The dispersed clay suspension was then transferred to the chlorhydrol solution, and kept stirred using the immersion pump. Once the clay suspension had thoroughly mixed, $FeCl_3$ solution (268 mL) was added to the suspension and the pH was raised to a minimum of 4 by the addition of sodium hydroxide (240 mL, 8M), as the $FeCl_3$ solution is very acidic owing to the presence of HCl. The solution was then stirred and heated at about 70° C. for 30 minutes. The QAS DMHTB-75 (302 g) was then added and the solution was left for a further 30 minutes at about 70° C.

Samples were taken of the clay preparations for characterisation. Approximately 50 mL of the clay suspension was taken for analysis. The clays were removed from solution by suction filtration through a 7.0 cm Whatman No. 1 filter paper. The clay was then washed with copious amounts of water and allowed to air dry by suction. A small amount of clay was taken and re-dispersed in distilled water. This suspension was then applied to a glass slide to give an even film of clay. The glass slides were then air dried under cover overnight before drying in an oven (110° C.) to remove all of the intercalated water. A Picker High Precision Diffractometer was used for all characterisation studies done on the clays. The X-ray source used was Cu which produced $CuK\alpha_1$ radiation with a wavelength of 1.5405981 Å. The incident beam monochromator used was Ge(lll planes), and the scintillation detector was a Phillips PW 1964/60.

Measurements have established that in such modified clays, pillaring increases the spaces between the layers from about 10 Å to about 20 Å, as can be seen from FIGS. 6 to 12 which show the results of X-ray defraction analysis carried out on the modified clays produced in accordance with Examples 1 to 7.

BRIEF DESCRIPTION OF THE DRAWINGS

FIG. 6A and B show the results for the clay of Example 1, respectively after air drying at ambient temperature and after drying at 100° C. The large peak at 22.94 in FIG. 6A establishes that effective pillaring occurred, the small peak at 10.22 showing the small proportion remaining unpillared, whilst the similar results in FIG. 6B show that the pillaring was maintained after drying at an elevated temperature.

FIG. 7A and 7B show similar results for the clay in accordance with Example 2, which had been exchanged with ferric ion after pillaring.

FIGS. 8A and 8B show similar results for the clay of Example 3.

FIGS. 9A and 9B, which show the results for Example 4 which uses an aliphatic QAS rather than an aromatic QAS as employed in Example 1, and it will be seen that, in the absence of ferric ion, the extent of pillaring is somewhat reduced as compared with the use of an aromatic QAS.

FIGS. 10A and 10B show the results for example 5, showing that the addition of ferric ion with an aliphatic QAS produces somewhat less pillaring than with an aromatic QAS.

FIGS. 11A and 11B confirm similar results for the clay of Example 6.

FIG. 12A illustrates the results for the intermediate clay before the addition of QAS in Example 7, where it can be seen that a substantial portion of the clay remained unpillared, thereby confirming that the subsequent added QAS is ion exchanged with the clay and contributes significantly to the pillaring.

FIG. 12B illustrates the results for an amalgamated sample taken from eight batches in accordance with Example 7 prepared for site trials. The XRD data obtained for this sample shows that most of the clay has been pillared, giving a $d_{001}$ spacing at 17.42 Å. This confirms that under larger scale production conditions the clay produced on a laboratory scale as Example 2 largely retains the same characteristics.

Figure 1:
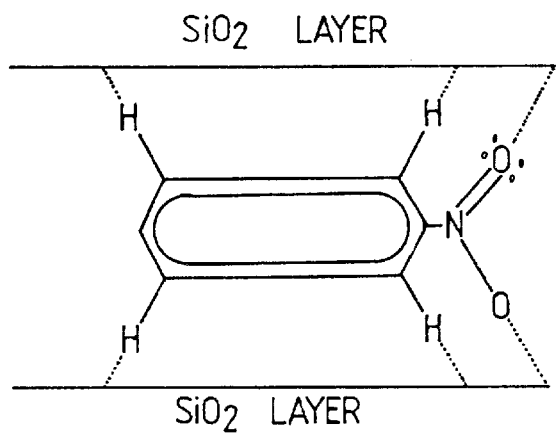
FIGS. 1 to 5 illustrate some basic examples of possible interactions between selected commonly occurring organic compounds and the clay matrix.
Figure 2:
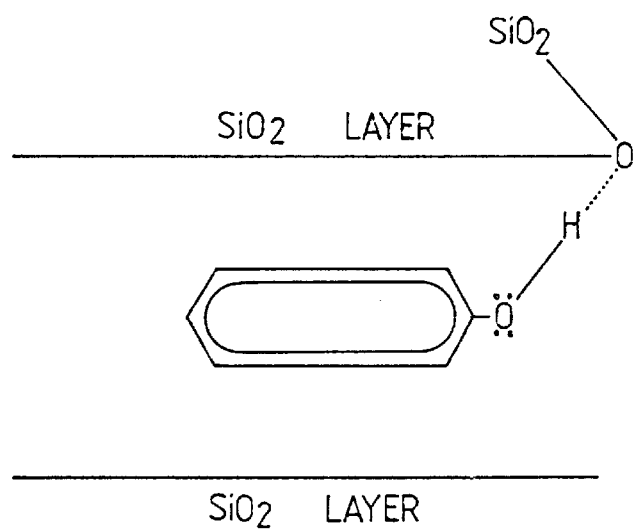
Figure 3:
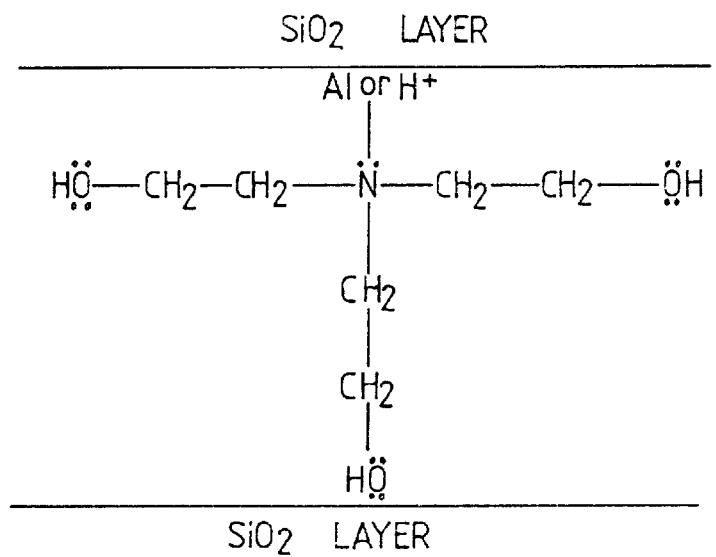
Figure 4:
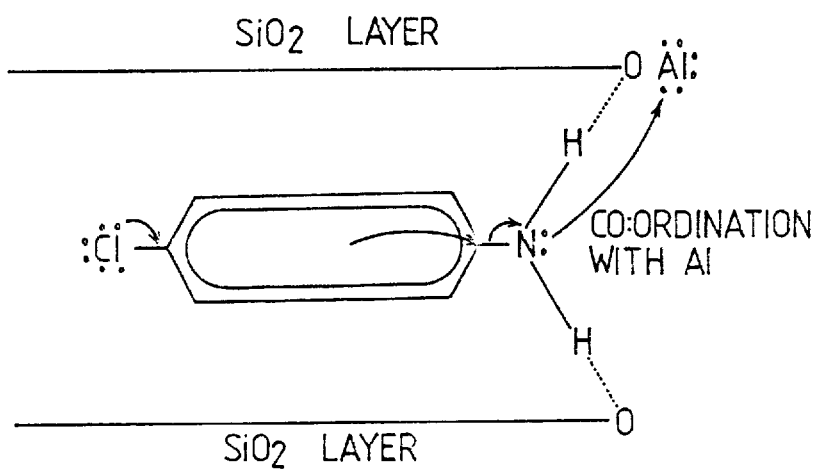
Figure 5:
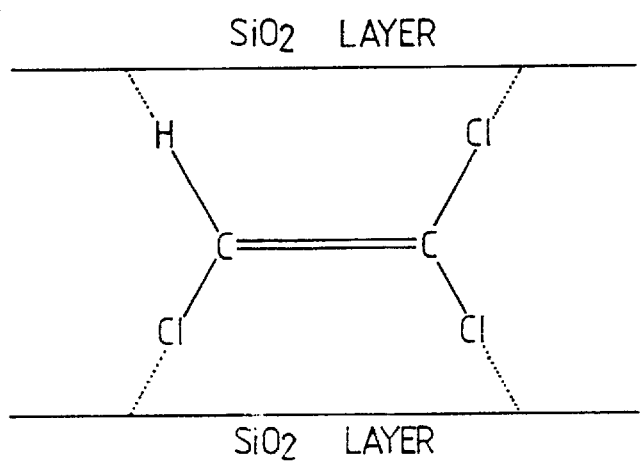

Clay produced in accordance with Example 7 has been used successfully for the experimental treatment of land contaminated with toxic organic materials and has been found to be effective in the containment of such materials when used in combination with conventional mechanical stabilisation treatments.

Whilst in Examples 1 to 7 ferric ion has been used as the transition metal, it will be appreciated that salts of other transition metals may be employed, depending mainly on commercial availability, economic factors, and toxicity. For example manganese and cobalt salts may be satisfactory, but nickel and chromium salts may be too toxic in themselves to be acceptable.

Modified clays in accordance with the invention may be used in a wide range of applications, generally in combination with known treatment/stabilisation materials.

In contaminated land remediation projects, there is likely to be a complex mixture of both organic and inorganic contaminants within the soil. In practice, an optimum mix will be formulated to address the worst case scenario. The modified organoclays will constitute a relatively small proportion of the overall stabilisation/fixation technology. The majority of the mix will comprise of cementitious and pozzolanic products. Inorganic contaminants will be chemically fixed by reaction with the inorganic matrix structure; this will only be possible if organic contaminants are simultaneously absorbed by the modified organophilic clays.

However, in the treatment of hazardous waste as such, the modified clay may be used as a stand-alone treatment, or in combination with cementitious and/or pozzolanic products, whilst in the treatment of ground water the modified clay may be used alone, or in combination with activated carbon, when the clay will remove organics that would otherwise interfere with the absorbent action of the activated carbon.

Whilst the examples detailed above are concerned with the treatment of contaminated land, the novel materials of the present invention can also be used to treat contaminated water or air by passing a stream of such water or air over or through the modified clay in order to "fix" the contaminants.

I claim:

1. A modified organoclay for treatment of material contaminated with organic wastes, the modified organoclay comprising:
   a clay treated with an agent selected from the group consisting of a quaternary ammonium salt and a polar organic compound to form an organoclay having organophilic properties, said organoclay being modified by treatment by a pillaring agent selected from the group consisting of aluminum chlorhydrol, metal hydroxide polymers, transition metal clusters, silicon oxides, titanium oxides, and mixtures thereof, and a salt of a transition metal in quantities corresponding to no more than 100% stoichiometric exchange of the exchangeable cations of the clay, to thereby establish chemical bonding between the clay and the organic wastes.

2. A modified organoclay according to claim 1 wherein the pillaring agent creates interlamellar spacing sufficient to provide access for organic molecules of about the size of polychlorinated biphenyls and polyaromatic hydrocarbons.

3. A modified organoclay according to claim 2 wherein the interlamellar spacing $d_1$ is at least 15 Å ($15 \times 10^{-10}$ m).

4. A modified organoclay according to claim 1 wherein the pillaring agent comprises an aluminum hydroxide polymer.

5. A modified organoclay according to claim 1 including intercalation additives comprising a combination of an aluminum hydroxide polymer, a quaternary ammonium salt and a salt of a transition metal.

6. A modified organoclay according to claim 1 wherein the transition metal salt comprises ferric salt.

7. A modified organoclay according to claim 6 wherein the transition metal salt comprises ferric chloride.

* * * * *